(12) United States Patent
Tunis, III et al.

(10) Patent No.: US 9,316,467 B2
(45) Date of Patent: Apr. 19, 2016

(54) ARMORED DOOR PANEL

(71) Applicants: Hardwire, LLC, Pocomoke City, MD (US); George C. Tunis, III, Ocean City, MD (US)

(72) Inventors: George C. Tunis, III, Ocean City, MD (US); Scott Kendall, Ocean City, MD (US); Emily Heinauer, Ocean City, MD (US)

(73) Assignee: Hardwire, LLC, Pocomoke City, MD (US)

( * ) Notice: Subject to any disclaimer, the term of this patent is extended or adjusted under 35 U.S.C. 154(b) by 0 days.

(21) Appl. No.: 14/589,076

(22) Filed: Jan. 5, 2015

(65) Prior Publication Data

US 2015/0143986 A1 May 28, 2015

Related U.S. Application Data

(63) Continuation of application No. 14/208,092, filed on Mar. 13, 2014, now Pat. No. 8,991,118.

(60) Provisional application No. 61/787,495, filed on Mar. 15, 2013.

(51) Int. Cl.
| | |
|---|---|
| *E06B 3/26* | (2006.01) |
| *F41H 7/04* | (2006.01) |
| *E05G 1/026* | (2006.01) |
| *E05G 1/10* | (2006.01) |
| *B43L 1/00* | (2006.01) |
| *F41H 5/013* | (2006.01) |

(Continued)

(52) U.S. Cl.
CPC .............. *F41H 7/048* (2013.01); *B29C 65/48* (2013.01); *B29C 65/5057* (2013.01); *B32B 37/26* (2013.01); *B32B 38/10* (2013.01); *B43L 1/00* (2013.01); *B43L 1/008* (2013.01); *E05G 1/024* (2013.01); *E05G 1/026* (2013.01); *E05G 1/10* (2013.01); *F41H 5/013* (2013.01); *F41H 5/0428* (2013.01); *F41H 5/0471* (2013.01); *F41H 5/226* (2013.01); *B29L 2031/724* (2013.01); *B32B 2037/268* (2013.01); *Y10T 29/49716* (2015.01); *Y10T 156/10* (2015.01)

(58) Field of Classification Search
CPC ......... F41H 7/044; F41H 5/08; F41H 5/0478; B29C 70/465; B29L 2031/768; B29L 2031/3005; B29K 2105/08; B29K 2067/003
USPC ...................................... 52/202, 203; 434/408
See application file for complete search history.

(56) References Cited

U.S. PATENT DOCUMENTS

| 227,662 A | 5/1880 | Thompson |
|---|---|---|
| D23,933 S | 1/1895 | Odgers |

(Continued)

OTHER PUBLICATIONS

Armacell Engineered Foams, Ensolite®, Submittal Sheet (effective Jun. 8, 2007).

(Continued)

*Primary Examiner* — Mark Wendell
(74) *Attorney, Agent, or Firm* — Posternak Blankstein & Lund LLP

(57) ABSTRACT

An armored door panel includes a planar device having a layered arrangement including a protection layer comprised of a ballistic material and an outer surface layer arranged on the outer side of the protection layer. The planar device is affixed to an existing door to prevent ballistic projectile from penetrating the door.

28 Claims, 4 Drawing Sheets

(51) Int. Cl.
*F41H 5/04* (2006.01)
*F41H 5/22* (2006.01)
*E05G 1/024* (2006.01)
*B29C 65/48* (2006.01)
*B29C 65/50* (2006.01)
*B32B 37/26* (2006.01)
*B32B 38/10* (2006.01)
*B29L 31/00* (2006.01)

(56) References Cited

U.S. PATENT DOCUMENTS

| | | | |
|---|---|---|---|
| 634,922 A | 10/1899 | Waldrip | |
| D42,068 S | 12/1911 | Stippich | |
| D42,117 S | 1/1912 | Bardezbanian | |
| 1,361,678 A | 12/1920 | Buck | |
| D67,479 S | 6/1925 | Ward | |
| 1,693,761 A | 12/1928 | Macripo | |
| D132,127 S | 4/1942 | Jones | |
| D164,008 S | 7/1951 | Loyd | |
| D264,419 S | 5/1982 | Dorman et al. | |
| D284,678 S | 7/1986 | Shamoon | |
| 4,628,572 A | 12/1986 | Chang | |
| 4,648,189 A | 3/1987 | Michel | |
| D298,489 S | 11/1988 | Sornborger | |
| 5,145,141 A | 9/1992 | Hunter | |
| D343,865 S | 2/1994 | Pohl | |
| 5,308,034 A | 5/1994 | Hunter | |
| D354,087 S | 1/1995 | Dunlap et al. | |
| 5,422,155 A | 6/1995 | Spence, Jr. | |
| 5,516,151 A | 5/1996 | Mund et al. | |
| 5,527,568 A | 6/1996 | Boone et al. | |
| D396,065 S | 7/1998 | Johnson et al. | |
| D429,994 S | 8/2000 | Ziegler | |
| D435,066 S | 12/2000 | Hurschman | |
| D443,655 S | 6/2001 | Chaikel et al. | |
| D496,068 S | 9/2004 | Mandel | |
| 6,871,821 B2 * | 3/2005 | Takahama | B64C 1/1469 244/118.5 |
| D506,074 S | 6/2005 | Chen et al. | |
| D507,302 S | 7/2005 | Chen et al. | |
| D522,255 S | 6/2006 | Bruce | |
| D535,256 S | 1/2007 | Fort et al. | |
| D558,270 S | 12/2007 | Beno | |
| D562,589 S | 2/2008 | Mellon | |
| D570,166 S | 6/2008 | Brownlee | |
| 7,429,706 B2 | 9/2008 | Ho | |
| D590,018 S | 4/2009 | Nash et al. | |
| D604,053 S | 11/2009 | Liu et al. | |
| 7,685,921 B2 * | 3/2010 | Dagher | F41H 5/013 109/80 |
| 7,717,468 B2 | 5/2010 | Isaacs | |
| D623,226 S | 9/2010 | Hoch et al. | |
| D623,227 S | 9/2010 | Hoch et al. | |
| D623,693 S | 9/2010 | Hoch et al. | |
| 8,006,605 B2 | 8/2011 | Tunis et al. | |
| D666,674 S | 9/2012 | Moore et al. | |
| D677,257 S | 3/2013 | Andre et al. | |
| D684,363 S | 6/2013 | Wanders | |
| D687,100 S | 7/2013 | Tunis et al. | |
| 8,739,675 B2 | 6/2014 | Tunis et al. | |
| 8,850,949 B1 * | 10/2014 | Lopez | F41H 5/24 109/49.5 |
| 2002/0180205 A1 | 12/2002 | Anderson | |
| 2003/0080248 A1 * | 5/2003 | Morgan | F41H 5/0457 244/118.5 |
| 2006/0097989 A1 | 5/2006 | Ho | |
| 2007/0126224 A1 | 6/2007 | Isaacs | |
| 2010/0083819 A1 * | 4/2010 | Mann | A61K 39/00 89/36.02 |
| 2012/0090452 A1 | 4/2012 | Sudhakar | |
| 2012/0152096 A1 * | 6/2012 | Peters | F41H 5/06 89/36.01 |
| 2013/0284003 A1 | 11/2013 | Dodsworth | |
| 2013/0302581 A1 | 11/2013 | Astete et al. | |
| 2014/0053717 A1 * | 2/2014 | Bowen | F41H 5/0478 89/36.02 |

OTHER PUBLICATIONS

Armacell Engineered Foams, Ensolite® IV1, Automotive and Industrial Specifications, 2011.
Texcalibur Armor, Custom Armored Car Kits, available Mar. 13, 2014, www.cararmorkits.com/.
Texcalibur Armor, Armoring Process, available Mar. 13, 2014, texcaliburarmor.com/armoringprocess.html.
Texcalibur Armor, Armoring Materials, available Mar. 13, 2014, texcaliburarmor.com/armoringmaterials.html.
TAC (Texas Armoring Corporation), Bulletproof Car Armoring Manufacturing Process, available Mar. 13, 2014, texasarmoring_com/armored_vehicle_bulletproofing_process.html.
TAC (Texas Armoring Corporation), Bulletproof Car Materials for Armoring Manufacturing Process, available Mar. 13, 2014, texasarmoring_com/armored_vehicle_bulletproofing_materials.html.
TAC (Texas Armoring Corporation), Armored Cars & Bulletproof Vehicle Levels, available Mar. 13, 2014, texasarmoring.com/armoring_levels.html.
International Armoring Corporation, Bullet Proof Specifications of IAC, available Mar. 13, 2014, armormax.com/armored-cars-bulletproof-specs.html.

* cited by examiner

ARMORED DOOR PANEL

CROSS REFERENCE TO RELATED APPLICATIONS

This application is related to U.S. Provisional Patent Application No. 61/753,177, filed on Jan. 16, 2013, U.S. Design Pat. Application No. 29/446,050, filed on Feb. 20, 2013, U.S. Design Pat. Application No. 29/446,070, filed on Feb. 20, 2013, and U.S. Design Pat. Application No. 29/446,073, filed on Feb. 20, 2013, the disclosures of all of which are incorporated by reference herein.

This application is a continuation application claiming priority under 35 U.S.C. §120 of U.S. patent application Ser. No. 14/208,092, filed on Mar. 13, 2014, which claims the benefit under 35 U.S.C. §119(e) of U.S. Provisional Patent Application No. 61/787,495, filed on Mar. 15, 2013, the disclosures of which are incorporated by reference herein.

STATEMENT REGARDING FEDERALLY SPONSORED RESEARCH OR DEVELOPMENT

N/A

BACKGROUND OF THE INVENTION

High security doors are known that have steel layers incorporated into the door during manufacture and prior to installation. Retrofit security features for doors are often directed toward door jambs, locks, or latches for preventing doors from being easily broken in.

SUMMARY OF THE INVENTION

An armored door panel is provided that can be attached to existing doors to prevent ballistic projectiles from penetrating the door. The armored door panel is affixed to the surface of a door facing in toward a room to be protected.

In one embodiment, the door panel comprises a planar device having a layered arrangement and sized to cover all or substantially all of an existing door. The planar device includes a protection layer comprised of a ballistic material, the protection layer including an inner side facing the door and an outer side facing outwardly from the door. An outer surface layer is disposed on the outer side of the protection layer. The planar device is affixed to the door with an affixation element such as adhesive or mechanical fasteners.

The outer surface layer can include a dry erase markable or whiteboard surface. In one embodiment, the whiteboard surface can be comprised of a film, or two or more layers of films, of poly(ethylene terephthalate) (PET). In other embodiments, the outer surface layer can comprise a ceramic material, a glass material, an enamel material, a porcelain material, a melamine material, or a painted surface.

The ballistic protection layer is comprised of a composite material of fibers embedded in a matrix. The fibers can be in the form of fabric sheets of woven or unidirectional fibers. The stacked sheets can be arranged in any suitable orientation of the fibers, such as unidirectional sheets alternating 0°, 90°, etc. The particular material(s) for the ballistic protection layer, the number of laminations, the areal density, and the thickness of the ballistic protection layer can be selected, configured, and sized to prevent penetration by a particular threat level, such as a hand gun, shot gun, or an assault rifle, or a threat level of the National Institute of Justice, such as level IIIA, or a STANAG performance level.

DESCRIPTION OF THE DRAWINGS

The invention will be more fully understood from the following detailed description taken in conjunction with the accompanying drawings in which.

DETAILED DESCRIPTION OF THE INVENTION

This application is related to U.S. Provisional Patent Application No. 61/753,177, filed on Jan. 16, 2013, U.S. Design Pat. Application No. 29/446,050, filed on Feb. 20, 2013, U.S. Design Pat. Application No. 29/446,070, filed on Feb. 20, 2013, and U.S. Design Pat. Application No. 29/446,073, filed on Feb. 20, 2013, the disclosures of all of which are incorporated by reference herein. This application claims priority under 35 U.S.C. §120 of U.S. patent application Ser. No. 14/208,092, filed on Mar. 13, 2014, which claims priority under 35 U.S.C. §119(e) of U.S. Provisional Patent Application No. 61/787,495, filed on Mar. 15, 2013, the disclosure of both of which are incorporated by reference herein.

Figures 1, 2:
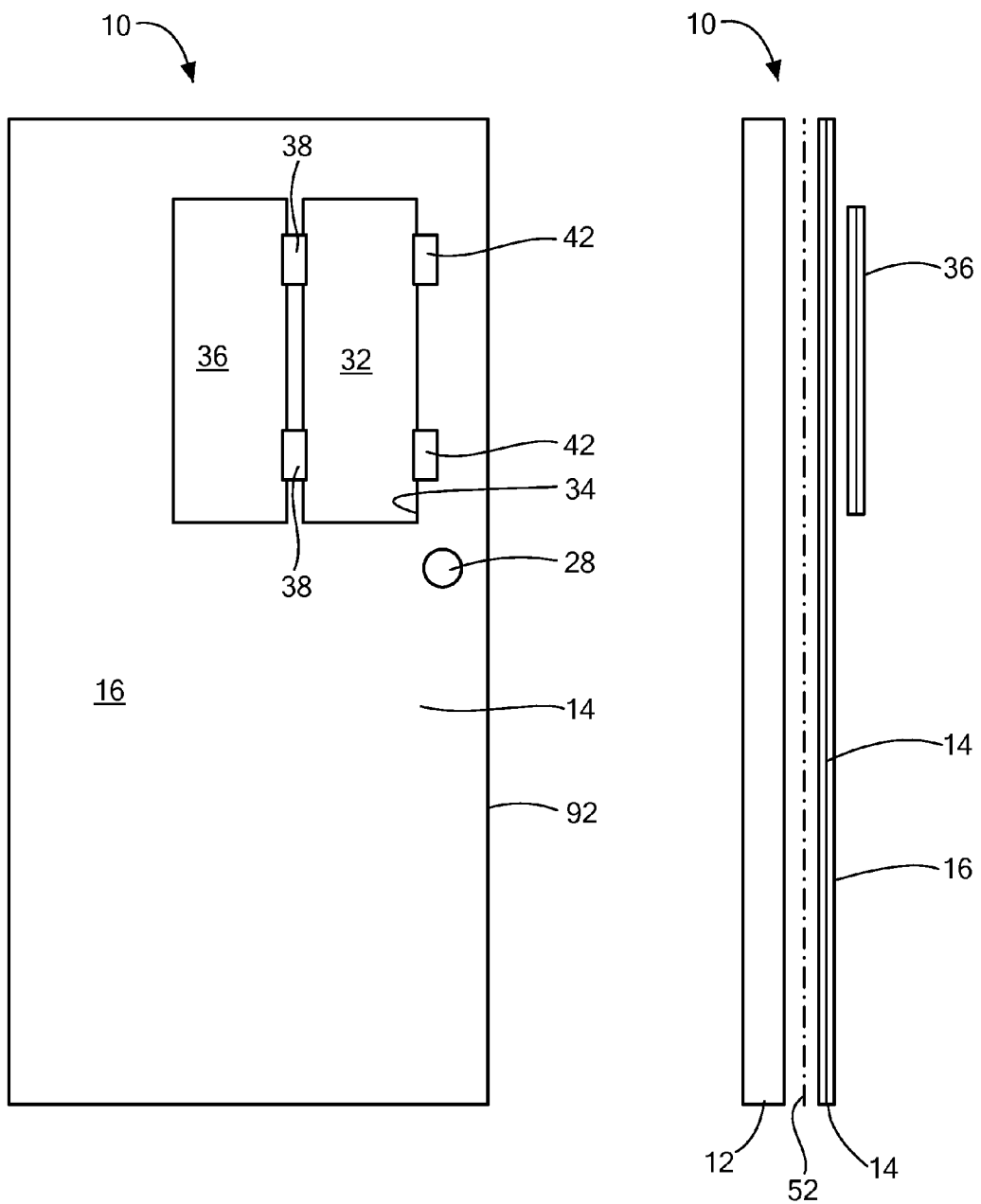
FIG. 1 is a front view of an armored door panel on a door according to the present invention.
FIG. 2 is an exploded side view of the door and panel of FIG. 1.
Figure 3:
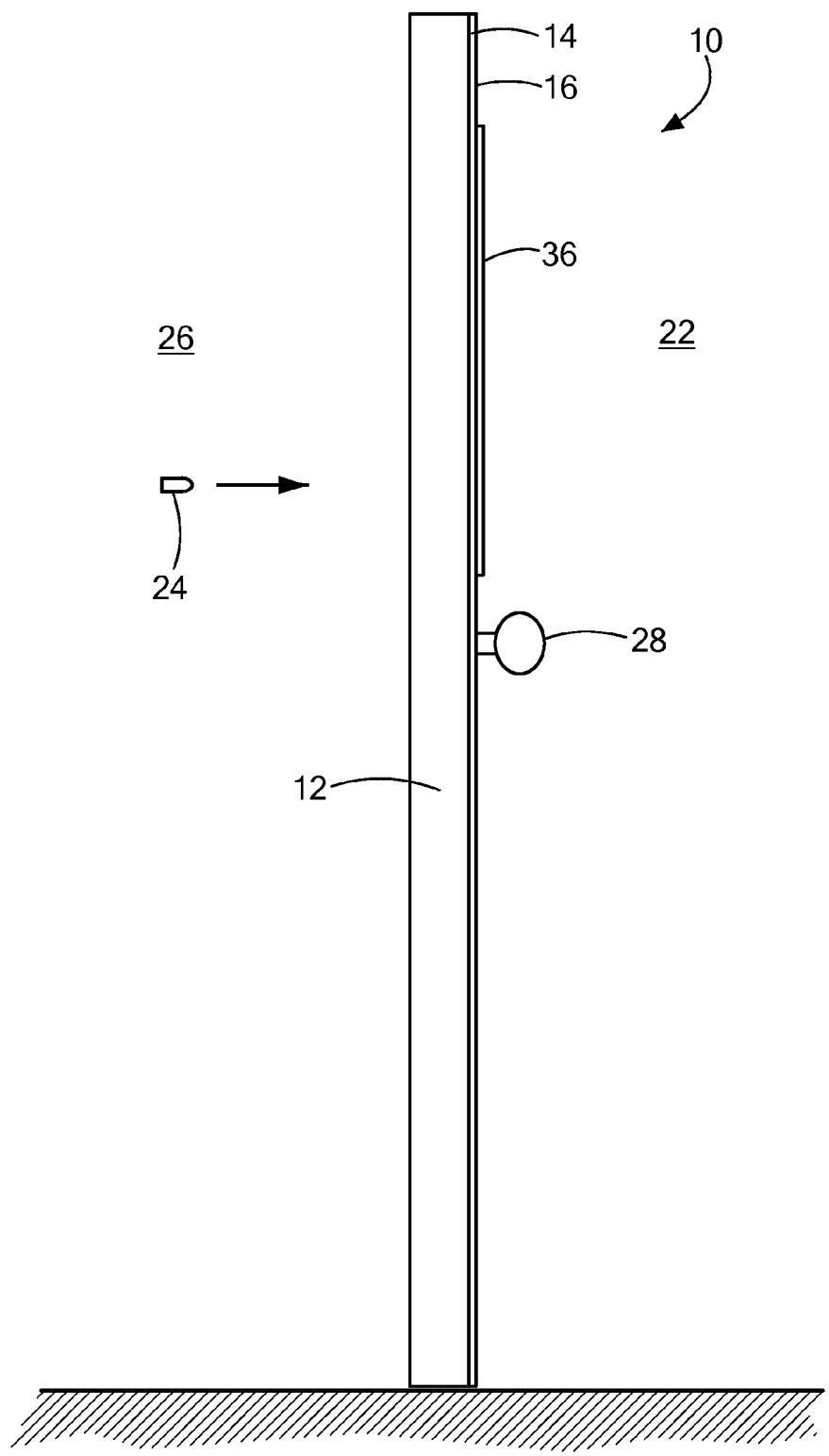
FIG. 3 is a partial side view of the panel of FIG. 1.

An embodiment of an armored door panel 10 affixed to a surface of a door 12 is illustrated in FIGS. 1-3. The door panel includes a ballistic protection layer 14 and an outer surface layer 16. The door panel 10 is affixed to the surface of the door 12 facing toward the room 22 to be protected. In this manner, the door panel prevents projectiles 24 fired at the door from a location 26 outside of the room from penetrating into the room. The outer surface layer 16 of the door panel 10 faces outwardly toward the room 22 and provides a surface that is more visually attractive than the ballistic protection layer 14 and can incorporate other features, such as a markable whiteboard surface, a corkboard, or a bulletin board.

The door panel has a generally rectangular shape and can be sized to cover the entire door or a substantial part of the door. For example, the door panel can cover the door from 18 inches above the floor to the top of the door. The door panel can include one or more apertures 18 for door features such as a doorknob or handle 28. Similarly, the door panel can be configured to avoid a door assist device, which if present is often mounted at the top of the door.

The ballistic protection layer 14, which may also be referred to as a catcher layer, can be comprised of a composite material of fibers embedded in a matrix. The fibers can be in the form of fabric sheets of woven or unidirectional fibers. The stacked sheets can be arranged in any suitable orientation of the fibers, such as unidirectional sheets alternating 0°, 90°, etc. The sheets can be stacked and laminated together along with the material(s) forming the outer surface layer.

In one embodiment, the ballistic protection layer 14 is comprised of an ultra high molecular weight polyethylene fiber material in a high binding resin, such as a urethane resin. One commercially available suitable material is DYNEEMA® HB-26. SPECTRA® material is another commercially available material that may be suitable. Other suitable materials for the ballistic protection layer include composite materials based on fibers of fiberglass, KEVLAR®, aramid, Twaron, S-glass, nylon, or carbon. Combinations of fibers can also be used. Resins can be thermoset or thermoplastic resins.

The particular material(s) for the ballistic protection layer 14, the number of laminations, the areal density, and the thickness of the ballistic protection layer can be selected, configured, and sized to prevent penetration by a particular threat level, such as a hand gun, shot gun, or an assault rifle, or a particular National Institute of Justice threat level or a STANAG performance level. For example, a ballistic protection layer of DYNEEMA® HB-26 material, laminated under heat and pressure, having a thickness of 0.20 inch and an areal density of 1.0 lb/ft$^2$ (4900 g/m$^2$) is sufficient to meet the National Institute of Justice Threat Level IIIA. A greater thickness and/or areal density would provide greater protection. The National Institute of Justice publication "Ballistic Resistance of Body Armor NIJ Standard-0101.06," available on the National Institute of Justice website www.ojp.usdoj.gov/nij is incorporated by reference herein.

The outer surface layer 16 can be formed from a variety of substrate materials. The substrate material(s) can be affixed to the ballistic protection layer 14 in any suitable manner, for example and without limitation, with an adhesive layer. In one embodiment, the outer surface layer includes a dry erase markable or whiteboard surface comprised of a film, or two or more layers of films, of poly(ethylene terephthalate) (PET). The PET film can be opaque or transparent. Opaque films are typically white, as markings in black marker are easily visible on a white surface. However, films in other colors and films with permanent designs printed thereon can be used. Typically, an opaque film is covered with a transparent film. It will be appreciated that the term "whiteboard" includes surfaces having other colors besides white and/or designs.

Ceramic, glass, enamel, or porcelain surfaces can also be used for the markable surface substrate. These materials are particularly notable for not absorbing dry erase or permanent markers. In one embodiment, a ceramic or glass can be fired onto a steel layer. The markable surface substrate can also be comprised of a high gloss paint layer on a suitable intermediate layer, such as a metal layer. A melamine layer can also be used for the markable surface substrate.

The outer surface 16 layer can also include an intermediate layer, the intermediate layer being then affixed to the ballistic protection layer. The intermediate layer can provide additional structural support and/or ballistic protection. Suitable materials for the intermediate layer include metals, such as steel or aluminum. A steel intermediate layer is also useful for providing magnetic properties, which allows magnets to stick to the whiteboard or other outer surface.

If the door to be protected includes a window 32, a window opening 34 and a window cover 36 can be provided in the panel 10. The cover 36 can be formed of the same ballistic protection layer as the door panel. An outer surface layer 16' can be provided on both sides of the ballistic protection layer. The window cover can be attached via one or more hinges 38 at the side of the window opening 34 and it can be swung over the window 32 when it is desired to cover the window. The cover 36 can be fastened in the covered position over the window opening with any suitable latch or closure mechanism 42, such as and without limitation, a magnet, mechanical fixture, or hook and loop fasteners. The cover can be held in the uncovered position, for example and without limitation, with a magnet, mechanical fixture, or hook and loop fasteners that can be readily disengaged when it is desired to cover the window with the cover.

Figure 5:
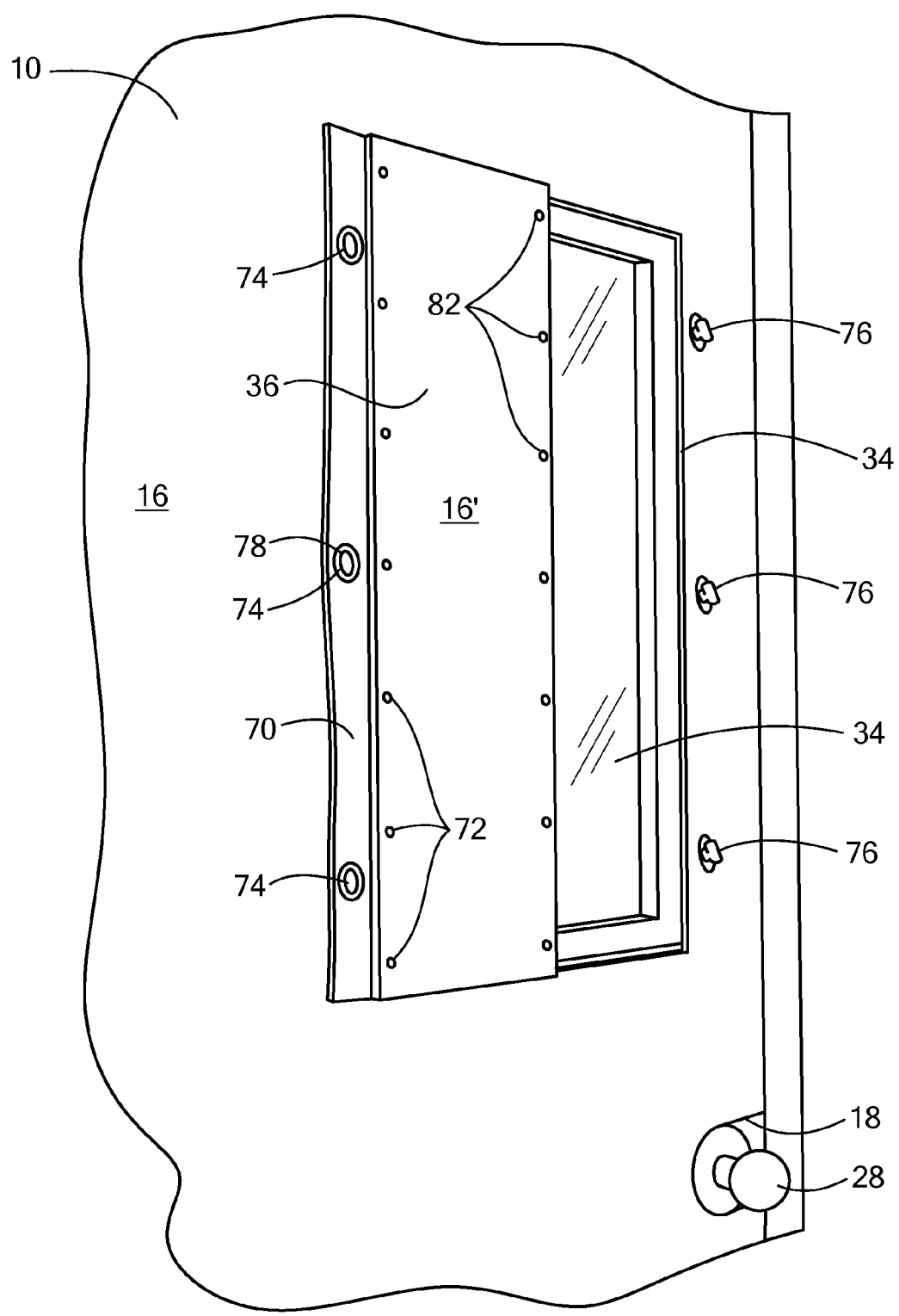
FIG. 5 is a partial view of a window cover of a door panel in an open position.

In one embodiment, a closure mechanism includes a strip of webbing 70 attached with rivets 72 or the like along a vertical edge of the window cover 36. See FIG. 5. The webbing extends beyond the window cover and includes a number of oval openings 74 through the extension, the openings protected by grommets. A turn button or twist lock type fastener 76 corresponding to each opening is attached to the panel 10 on the opposite side of the window opening 32. Three openings and three fasteners are shown, although any suitable number can be provided. When the cover is closed over the window opening, the turn buttons 76 fit through the openings 74 in one orientation and are twisted 90° to stay in place, thereby holding the window covering closed. One or more turn button or twist lock type fasteners 78 can also be mounted to the panel to hold the cover in the open position; generally, a single such fastener suffices for this position. In one embodiment, a hinge is also formed by a strip of webbing attached with rivets 82 or the like along a vertical edge of the window cover 36 and the window opening 32. The webbing is flexible and allows the window cover to move from an open position to a closed position over the window opening.

An edging or border can be formed around the entire periphery of the protection layer and the outer surface layer. The border protects the edges of the layers from damage and protects a user from sharp edges, particularly of the ballistic protection layer. The edging material can be any suitable material, such as a vinyl material. Edging can be included around the window opening and the window cover, particularly if this is included around the panel.

Figure 4:
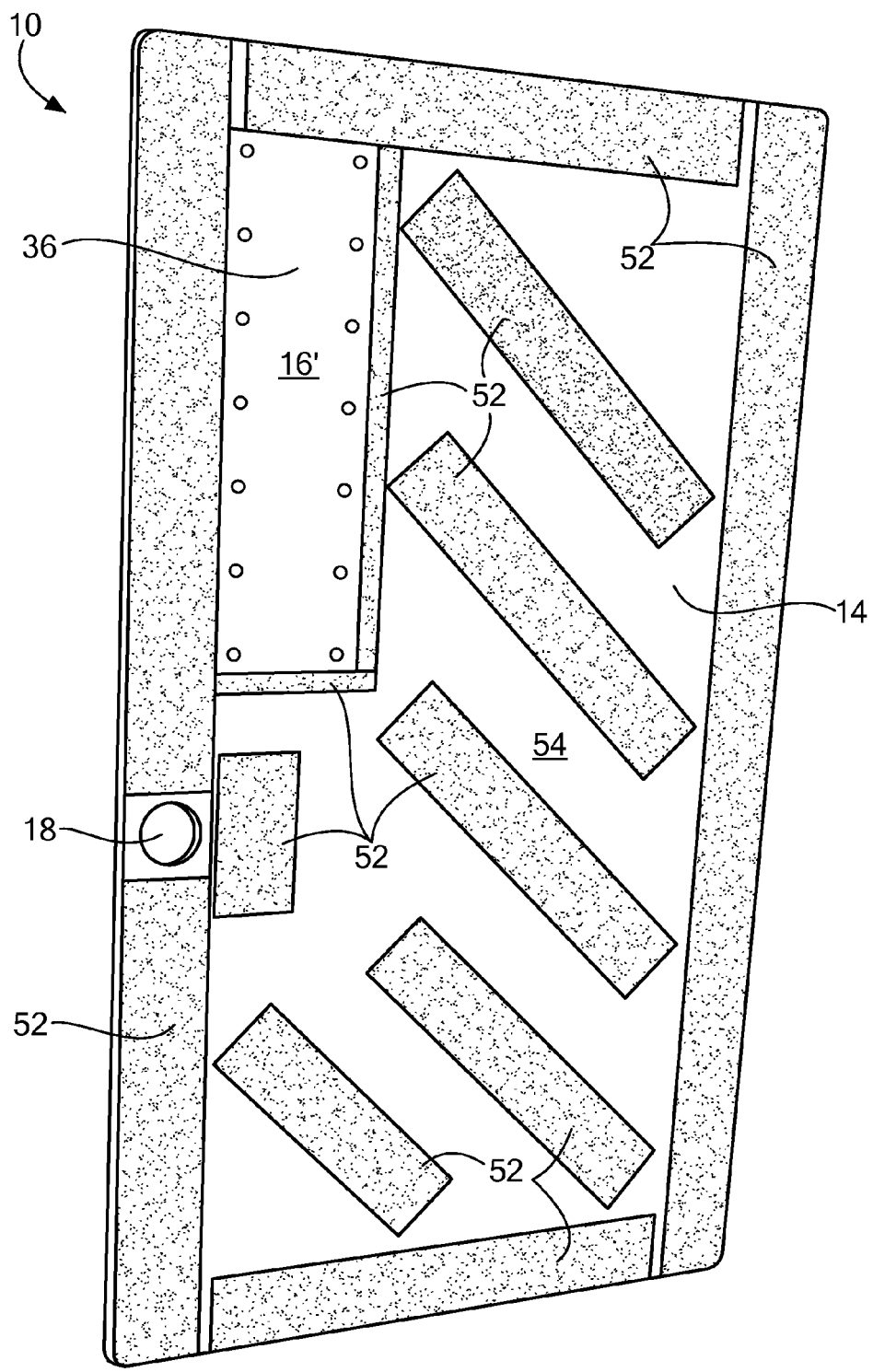
FIG. 4 is a view of an inner side of a door panel.

The door panel 10 can be affixed to the door surface in any suitable manner, such as, without limitation, an adhesive, which can be permanent or removable, or mechanical fasteners such as screws, bolts, rivets or clips. In one embodiment, a high strength acrylic adhesive in the form of a double-sided tape 52 is used, such as a VHB™ tape commercially available from 3M™. One side of the tape is applied to the inner side 54 of the panel 10, leaving the other side of the tape covered with a removable paper or film liner. The tape can be placed over a partial area of the inner side of the panel or over the entire surface area of the inner side of the panel. In one embodiment, edge areas of the door panel are substantially fully covered with tape, and regions within the edge areas are partially covered with tape, as illustrated in FIG. 4. The panel can be shipped in this state. When the panel is to be applied to a door, the paper liner is removed from the adhesive tape. The panel is positioned on the door and pressed into place.

In some cases, the door surface should first be cleaned, for example, with one or more of water, isopropyl alcohol, or a solvent for grease and oil. The door surface can be coated with an adhesion promoting primer to ensure better adhesion if necessary. A door made of a porous or fibrous material, such as wood, may benefit from painting to provide a more unified surface. The door surface can also be abraded to increase the surface area available for adhesion.

The door panel 10 including the ballistic protection layer 14 and the outer layer 16 can be manufactured in any suitable manner. In one embodiment, the ballistic protection layer, for example, layers of DYNEEMA® fabric, an adhesive layer and one or more PET layers are laid up in a press. Heat and pressure are applied to melt the adhesive, and the lamination is then cooled. An acrylic adhesive can be used. In one embodiment, a low melt thermoplastic adhesive can be used that, after the initial application of heat and cooling, converts to a thermoset material. NOLAX® adhesive is a suitable adhesive of this type.

Circuitry can be embedded in the armored door panel to facilitate various electronic functions. For example, the panel can incorporate electronic features to enable Wi-Fi or other wireless or wired communication. If a projectile penetrates the panel, for example, breaking a circuit, a Wi-Fi enabled panel can transmit a signal to a network to so indicate and to provide data identifying the door's location. Circuitry can be included so that the panel can also incorporate an emergency call-for-help device. The call feature can be automated, so that an emergency call is transmitted if a projectile hits the panel or if the window cover is closed. The device can also incorporate an emergency cord or button.

It will be appreciated that the various features described herein can be combined with each other in various ways. The invention is not to be limited by what has been particularly shown and described, except as indicated by the appended claims.

What is claimed is:

1. A method of retrofitting an existing door with an armor door panel, comprising the steps of:
affixing a planar device to a surface of an existing door, the planar device having a layered arrangement and sized to cover all or a portion of the surface of the existing door, the planar device comprising:
a protection layer comprising a ballistic material, the protection layer including an inner side facing the existing door and an outer side facing outwardly from the existing door, the ballistic material comprising layers of woven or unidirectional fibers of a high molecular weight polyethylene in sheet form embedded in a resin matrix, and
an outer surface layer arranged on the outer side of the protection layer, the outer surface layer comprising a dry erase markable surface that can be written on and wiped clean.

2. The method of claim 1, further comprising affixing the planar device to the surface of the existing door with an adhesive.

3. The method of claim 2, wherein the adhesive comprises a double-sided adhesive tape, one side of the adhesive tape applied to the inner side of the planar device, the other side of the adhesive tape covered with a removable paper or film liner; and
the affixing step further comprising:
removing the removable paper or film liner from the adhesive tape to expose an adhesive surface prior to affixing the planar device to the surface of the existing door,
positioning the planar device on the surface of the existing door, and
pressing the planar device to the surface of the existing door.

4. The method of claim 3, wherein edge areas of the planar device are substantially fully covered with the double-sided adhesive tape, and regions within the edge areas are partially covered with the double-sided adhesive tape.

5. The method of claim 1, further comprising cleaning the surface of the existing door prior to the step of affixing the planar surface to the existing door.

6. The method of claim 1, further comprising coating the surface of the existing door with at least one of an adhesion promoting primer or paint prior to the step of affixing the planar surface to the existing door.

7. The method of claim 1, further comprising affixing the planar device to the surface of the existing door with a mechanical fastening device.

8. The method of claim 1, further comprising affixing the planar device to the surface of the existing door that is facing toward a room to be protected.

9. The method of claim 1, wherein the planar device includes an aperture for a door knob, handle, or press bar or the door, and the affixing step further comprising placing the planar device on the surface of the existing door with the aperture around the door knob, handle, or press bar.

10. A retrofit armored door panel to prevent ballistic projectiles from penetrating a door, comprising:
a planar device having a layered arrangement and sized to cover all or a portion of an existing door, including:
a protection layer comprising a ballistic material, the protection layer including an inner side facing the existing door and an outer side facing outwardly from the existing door, the ballistic material comprising layers of woven or unidirectional fibers of a high molecular weight polyethylene in sheet form embedded in a resin matrix, the ballistic material providing protection against a National Institute of Justice Threat Level IIIA, and
an outer surface layer arranged on the outer side of the protection layer, the outer surface layer comprising a dry erase markable surface that can be written on and wiped clean; and
an affixation element to affix the planar device to the existing door comprising at least one of adhesive or a mechanical fastening device.

11. The retrofit armored door panel of claim 10, wherein the ballistic material of the protection layer has a thickness of 0.2 inch or greater.

12. The retrofit armored door panel of claim 10, wherein the affixation element comprises an adhesive layer, the adhesive layer comprising a high strength acrylic adhesive in the form of a double sided tape, one side of the tape applied to the inner side of the protection layer, and a release liner applied to an opposite side of the tape.

13. The retrofit armored door panel of claim 10, wherein the dry erase markable surface comprises a film of poly(ethylene terephthalate), a ceramic material, a glass material, an enamel material, a porcelain material, a melamine material, or a painted surface.

14. The retrofit armored door panel of claim 10, wherein the dry erase markable surface is opaque, white, colored, or transparent.

15. The retrofit armored door panel of claim 10, further comprising a window opening formed in the planar device and a window cover attached via one or more hinges on a side of the window opening to cover the window opening, the window cover having a layered arrangement comprised of the ballistic material of the protection layer and an outer surface layer on both sides of the ballistic material.

16. The retrofit armored door panel of claim 15, further comprising a closure to hold the window cover closed over the window opening.

17. The retrofit armored door panel of claim 10, further comprising an aperture in the planar device for a door knob, handle, or press bar of the door.

18. The retrofit armored door panel of claim 10, wherein the outer surface layer further includes a metal layer.

19. The retrofit armored door panel of claim 10, further comprising a protective border around the periphery of the planar device.

20. The retrofit armored door panel of claim 10, wherein the ballistic material has an areal density of 1.0 lb/ft$^2$ or greater.

21. The retrofit armored door panel of claim 10, wherein the ballistic material has an areal density of 1.0 lb/ft$^2$ or greater.

22. A retrofit armored door panel to prevent ballistic projectiles from penetrating a door, comprising:
a planar device having a layered arrangement and sized to cover all or a portion of an existing door, including:

a protection layer comprising a ballistic material, the protection layer including an inner side facing the existing door and an outer side facing outwardly from the existing door, the ballistic material comprising layers of woven or unidirectional fibers of a high molecular weight polyethylene in sheet form embedded in a resin matrix, the ballistic material providing protection against a National Institute of Justice Threat Level IIIA, an outer surface layer arranged on the outer side of the protection layer, and a window opening formed in the planar device and a window cover attached via one or more hinges on a side of the window opening to cover the window opening, the window cover having a layered arrangement comprising the ballistic material of the protection layer and an outer surface layer on both sides of the ballistic material; and an affixation element to affix the planar device to the existing door comprising at least one of adhesive or a mechanical fastening device.

23. The retrofit armored door panel of claim 22, further comprising a closure to hold the window cover closed over the window opening.

24. The retrofit armored door panel of claim 22, further comprising an aperture in the planar device for a door knob, handle, or press bar of the door.

25. The retrofit armored door panel of claim 22, wherein the outer surface layer further includes a metal layer.

26. The retrofit armored door panel of claim 22, further comprising a protective border around the periphery of the planar device.

27. The retrofit armored door panel of claim 22, wherein the ballistic material of the protection layer has a thickness of at least 0.2 inch or greater.

28. The retrofit armored door panel of claim 22, wherein the affixation element comprises an adhesive layer, the adhesive layer comprising a high strength acrylic adhesive in the form of a double sided tape, one side of the tape applied to the inner side of the protection layer, and a release liner applied to an opposite side of the tape.

* * * * *